United States Patent
Thomas et al.

(10) Patent No.: US 6,651,804 B2
(45) Date of Patent: Nov. 25, 2003

(54) SELF-PROPELLED ARTICULATED CONVEYOR SYSTEM

(75) Inventors: Terry M. Thomas, Franklin, PA (US); Gregory M. Chandler, Franklin, PA (US)

(73) Assignee: Joy MM Delaware, Inc., Wilmington, DE (US)

(*) Notice: Subject to any disclaimer, the term of this patent is extended or adjusted under 35 U.S.C. 154(b) by 11 days.

(21) Appl. No.: 10/135,803

(22) Filed: Apr. 30, 2002

(65) Prior Publication Data
US 2003/0201150 A1 Oct. 30, 2003

(51) Int. Cl.[7] .................. B65C 15/26; B65C 17/28; B65C 21/10; B65C 21/14; B65C 37/00
(52) U.S. Cl. .................. 198/594; 198/300; 198/861.2
(58) Field of Search ................. 198/300, 303, 198/594, 861.1, 861.2, 731

(56) References Cited

U.S. PATENT DOCUMENTS

| | | | |
|---|---|---|---|
| 2,966,984 A | | 1/1961 | Moon |
| 3,701,411 A | | 10/1972 | McGinnis |
| 4,646,906 A | | 3/1987 | Wilcox, Jr. |
| 4,742,904 A | | 5/1988 | Miller |
| 4,773,528 A | | 9/1988 | Anderson |
| 4,828,339 A | * | 5/1989 | Thomas et al. ............. 198/300 |
| 4,852,724 A | | 8/1989 | Bodimer |
| 4,865,185 A | | 9/1989 | Bodimer |
| 5,031,752 A | | 7/1991 | Rostowski |
| 5,096,048 A | | 3/1992 | Lachner |
| 5,165,766 A | | 11/1992 | Thomas |
| 5,188,208 A | | 2/1993 | Hall |
| 5,190,147 A | | 3/1993 | Pennington |
| 5,758,760 A | | 6/1998 | Vergeer |

* cited by examiner

Primary Examiner—Gene O. Crawford
(74) Attorney, Agent, or Firm—James Earl Lowe, Jr.

(57) ABSTRACT

A material conveying system capable of traversing a floor along a curvilinear path, the system comprising a plurality of framework members arranged in tandem on the surface along a portion of the path to form an elongated longitudinally extending conveyor train; and connector means on each framework member cooperate with connector means on each adjacent framework member for coupling the plurality of framework members, the connector means permitting movement between adjacent framework members. The conveying system also includes a plurality of the framework members including a crawler chain assembly comprising a plurality of crawler chain pads interconnected by chain links to form an endless loop. The crawler chain assembly extends over a lower portion of each of the plurality of framework members wherein the crawler chain pads are maintained in engagement with the floor, and over an upper portion having an upper surface that supports the chain pads. The adjacent framework members include cooperating means for limiting the articulation between adjacent framework members in the horizontal, vertical and longitudinal directions, such cooperating means comprising outboard side tubes having a trapping on one end, the trapping being received in the hollow other end of the side tube of the next adjacent frame member. The framework members also include means for supporting an orbitally moveable endless conveyor belt above the crawler chain assembly, the conveying run of the orbitally moveable conveyor belt operable to convey material substantially throughout the longitudinal extent of the train.

15 Claims, 11 Drawing Sheets

SELF-PROPELLED ARTICULATED CONVEYOR SYSTEM

BACKGROUND OF THE INVENTION

The present invention relates to conveyor systems, and more particularly, is directed to improvements related to the crawler chain of a self-propelled articulated conveyor system.

In mining operations, especially in the underground mining of coal and the like, a variety of conveyors are used to transport the mined materials from the mining machine to their ultimate transportation location. During the early stages of mine development, main haulageways are created within the mine to accommodate stationary main belt conveyors that ultimately transport the mined ore from the mine or to remote collection areas. A variety of different conveying systems and apparatuses have been developed for transferring the mined material from the mining machine to the main belt conveyors.

In the past, shuttle cars or other short distance haulage vehicles have been used to transport the mined material from the mining machine to the fixed terminal end of the main conveyor. The use of shuttle cars and other such haulage vehicles is intermittent, time consuming, and inefficient in not providing for the continuous transport of the mined materials from the mining machine to the fixed conveyor. Thus, in more recent years there have been several developments directed toward a mobile articulated conveyor that provides for continuous transport of the discharge of a continuous miner to the main conveyor as the miner advances into the mine face and changes the direction of its forward movement.

One of these more recently developed mobile articulated conveyors is shown in the Bodimer patent, U.S. Pat. No. 4,865,185, and sold by a company related to the assignee of this invention. More specifically, this invention is an improvement to the crawler-mounted conveying train shown in the Bodimer patent, which is incorporated herein by reference.

A number of different auxiliary conveying apparatuses exist for transferring the mined material from the discharge of the mobile articulated conveyor to a stationary panel conveyor or main conveyor. For example, in one conveyor arrangement, the discharge end of the mobile conveyor is arranged to tram beside the stationary main or panel conveyor and a third "bridge" conveyor is employed to transfer the mined ore from the mobile conveyor to the stationary conveyor.

SUMMARY OF THE INVENTION

An object of the present invention is to provide a conveyor with an improved traction drive system for moving the mobile articulated conveying system along the mine floor either straight or along curvilinear paths while substantially eliminating any binding or other deleterious forces normally associated with or resulting from moving a rigid member through. horizontal or vertical curved paths.

Still another object of the invention is to provide a conveyor system having a flexible track drive system capable of bending around horizontally and/or vertical curves while delineating a fixed elongated path within a mine.

The present invention provides a material conveying system capable of traversing a floor along a curvilinear path, the system comprising a plurality of framework members arranged in tandem on the surface along a portion of the path to form an elongated longitudinally extending conveyor train; and connector means on each framework member cooperate with connector means on each adjacent framework member for coupling the plurality of framework members, the connector means permitting movement between adjacent framework members. The conveying system also includes a plurality of the framework members including a crawler chain assembly comprising a plurality of crawler chain pads interconnected by chain links to form an endless loop. The crawler chain assembly extends continuously throughout the plurality of framework members along the longitudinal extent of the train, over a lower portion of each of the plurality of framework members wherein the crawler chain pads are maintained in engagement with the floor, and over an upper portion having an upper surface that supports the chain pads. The adjacent framework members include cooperating means for limiting the articulation between adjacent framework members in the horizontal, vertical and longitudinal directions, such cooperating means comprising outboard side tubes having a trapping on one end, the trapping being received in the hollow other end of the side tube of the next adjacent frame member. The framework members also include means for supporting an orbitally moveable endless conveyor belt above the crawler chain assembly, the conveying run of the orbitally moveable conveyor belt operable to convey material substantially throughout the longitudinal extent of the train.

In a preferred embodiment, the lower portion includes two spaced apart plates, each plate having an irregular forward edge and an irregular rearward edge so that at least part of the irregular forward edge of one framework member mates with at least part of the irregular rearward edge of an adjacent framework member to form a surface at least partially supporting the crawler chain pads as each traverses between adjacent framework members. The upper portion also has an upper surface that supports the chain pads, the upper portion including two spaced apart plates, each plate having an irregular forward edge and an irregular rearward edge so that at least part of the irregular forward edge of one framework member mates with at least part of the irregular rearward edge of an adjacent framework member to form a surface at least partially supporting the crawler chain pads as each traverses between adjacent framework members.

In a preferred embodiment, each of crawler chain pads is connected to a part of the chain links by a guide retainer assembly, the guide retainer assembly including a guide retainer having a width that is greater than larger of the spacing between the plates forming the upper and the lower portions of the framework member, and means for securing the guide retainer to a respective crawler chain pad between the upper and lower portion spaced apart plates so that the guide retainer is on the inside of the upper and lower portion spaced apart plates and the crawler chain pad is on the outside of the upper and lower portion spaced apart plates.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience and are not to be construed as limiting terms.

DETAILED DESCRIPTION OF THE PREFERRED EMBODIMENT OF THE INVENTION

Figure 1:
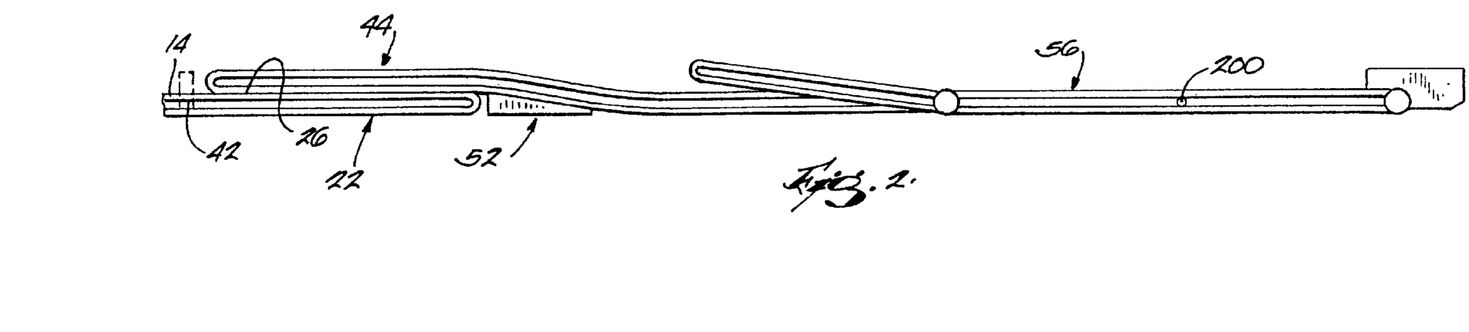
FIG. 1 is a top schematic view of the conveying system of this invention, including a main mine panel belt or conveyor, a main conveyor extension, an inclined transition extension, an auxiliary conveyor moveable over the top of the main conveyor extension, a self-propelled moveable articulated conveyor system, and a bridge conveyor extending between the discharge end of the moveable articulated conveyor and the auxiliary conveyor.
Figure 2:
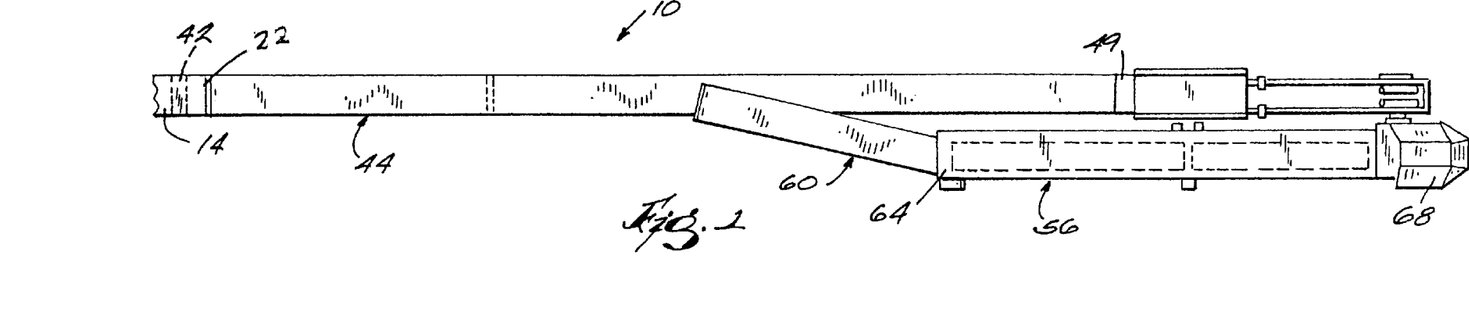
FIG. 2 is a side view of the conveying system shown in FIG. 1.

As shown schematically in FIG. 1, the invention is a conveying system 10 for receiving and conveying material from an articulated conveyor adapted for travel on a floor. The conveying system includes a main mine panel belt or conveyor 14 on the floor of the mine. As noted in the background of the invention, such main conveyors 14 are conventional and are used to transport the mined ore from the mine. Normally, the main conveyor 14 moves the mined material along a fixed path. The main conveyor 14 has a terminal end at a fixed location for receiving the material being mined.

Further, as is conventional in the art, the main conveyor 14 includes means (not shown) for supporting an endless conveyor belt (not shown) thereon. The conveyor belt does, however, include joints (not shown) that are separable so additional belt can be added when the main conveyor 14 needs to be lengthened.

The conveying system 10, as shown in FIG. 1, further includes a main conveyor extension 22 on the floor and having an upper surface 26, a moveable articulated conveyor system 56, and a bridge conveyor 60 extending from the discharge end 64 of the moveable articulated conveyor 56 to a point over the auxiliary conveyor 44. More particularly, the bridge conveyor 60 is a conventional device used for receiving the material discharged from an articulated conveyor system and conveying the material over onto another conveyor.

Figure 3:
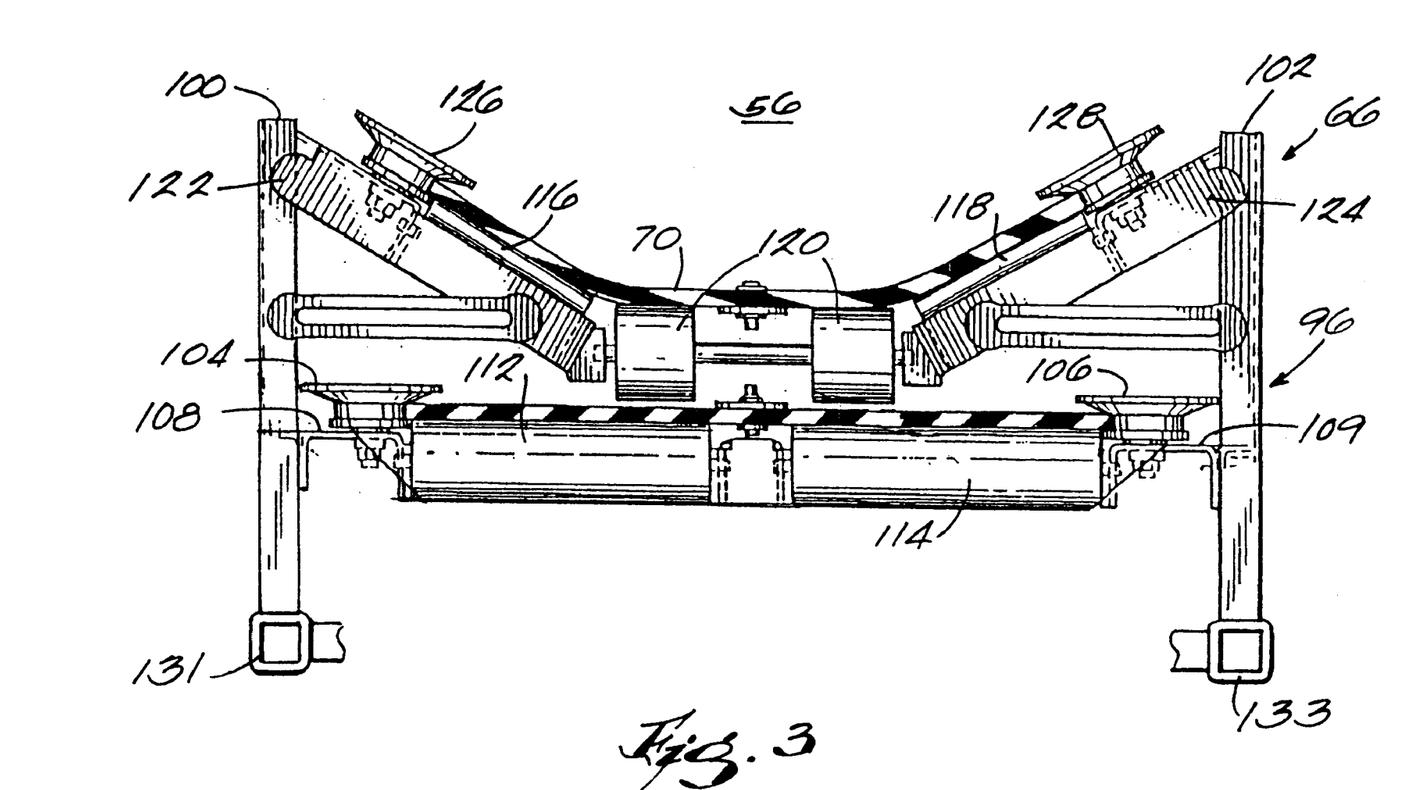
FIG. 3 is an end view of the articulated conveyor system framework member belt support structure.
Figure 6:
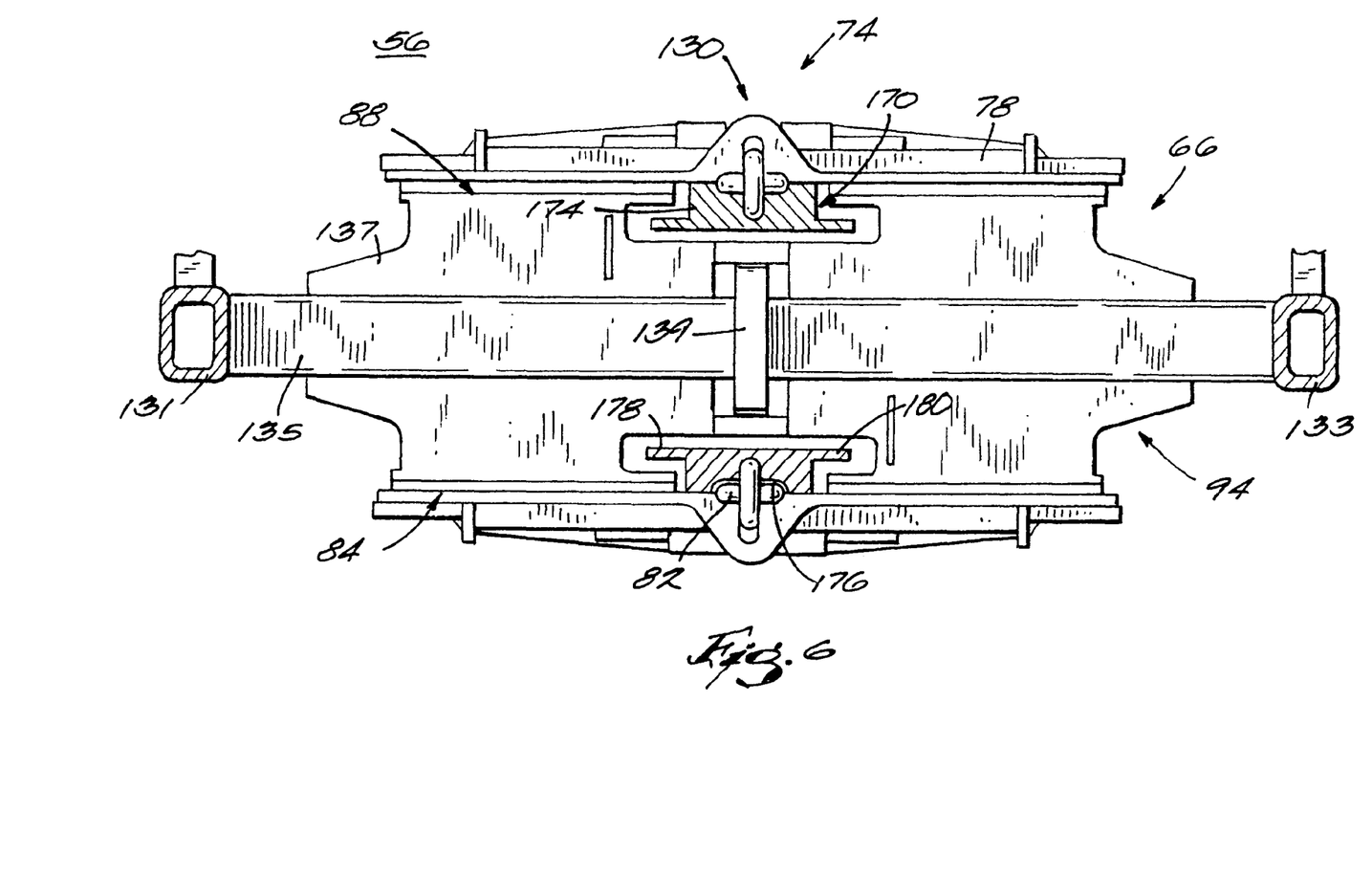
FIG. 6 is a cross-sectional view of one of the framework members taken along the line 5—5 in FIG. 5 showing a guide retainer.

More particularly, as shown in FIGS. 3 and 6, the articulated conveyor 56 includes a plurality of framework members 66 arranged in tandem on the mine floor to form an elongated longitudinally extending conveyor train. Further, as is shown in FIG. 3, the articulated conveyor includes an orbitally moveable conveying belt 70 supported by the train of framework members 66. In the preferred embodiment, as shown in FIG. 1, the articulated conveyor has a discharge end 64 and a material receiving end 68.

In the preferred embodiment, the receiving end 68 includes steering means (not shown) for directing the advancing conveyor 56 along an elongated path within the mine. Steering means (not shown) may also be included at the discharge end 64 to steer the articulated conveyor 56 during retreat from the mine face.

Figure 5:
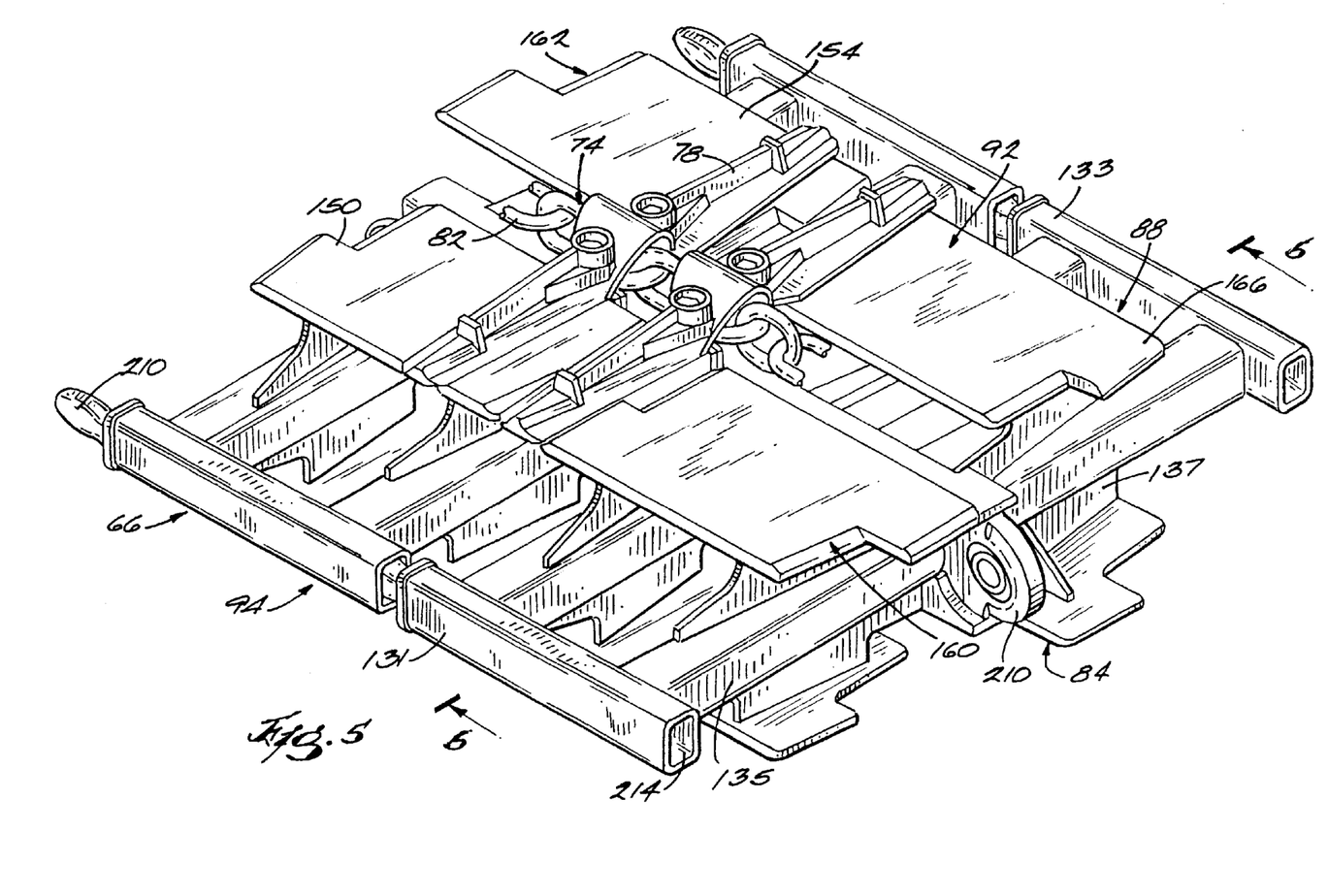
FIG. 5 is a prospective view of two tandemly disposed framework members which form the support part of the self-propelled moveable articulated conveyor system, and a partial view of the moveable articulated conveyor system crawler chain, with two crawler pads attached to a drive chain.

As shown in FIG. 5, the framework members 66 include a crawler chain assembly 74 comprising a plurality of crawler chain pads 78 interconnected by chain links 82 to form an endless loop. More particularly, the crawler drive chain assembly 74 is formed in an endless loop of horizontal and vertical links 82 with each crawler pad 78 attached to alternate horizontal links of the chain in series along the entire length of the articulated conveyor 56. Each crawler pad 78 is attached to the chain links 82 by means of a guide retainer assembly 130, as more particularly hereinafter described.

The crawler chain assembly 74 extends continuously throughout the plurality of framework members 66 along the longitudinal extent of the articulated conveyor 56. Still more particularly, the crawler chain assembly 74 extends over a lower portion 84 of each of the plurality of framework members 66 wherein the crawler chain pads 78 are maintained in engagement with the floor, and an upper portion 88 having an upper surface 92 that supports the chain pads 78.

Figure 7:
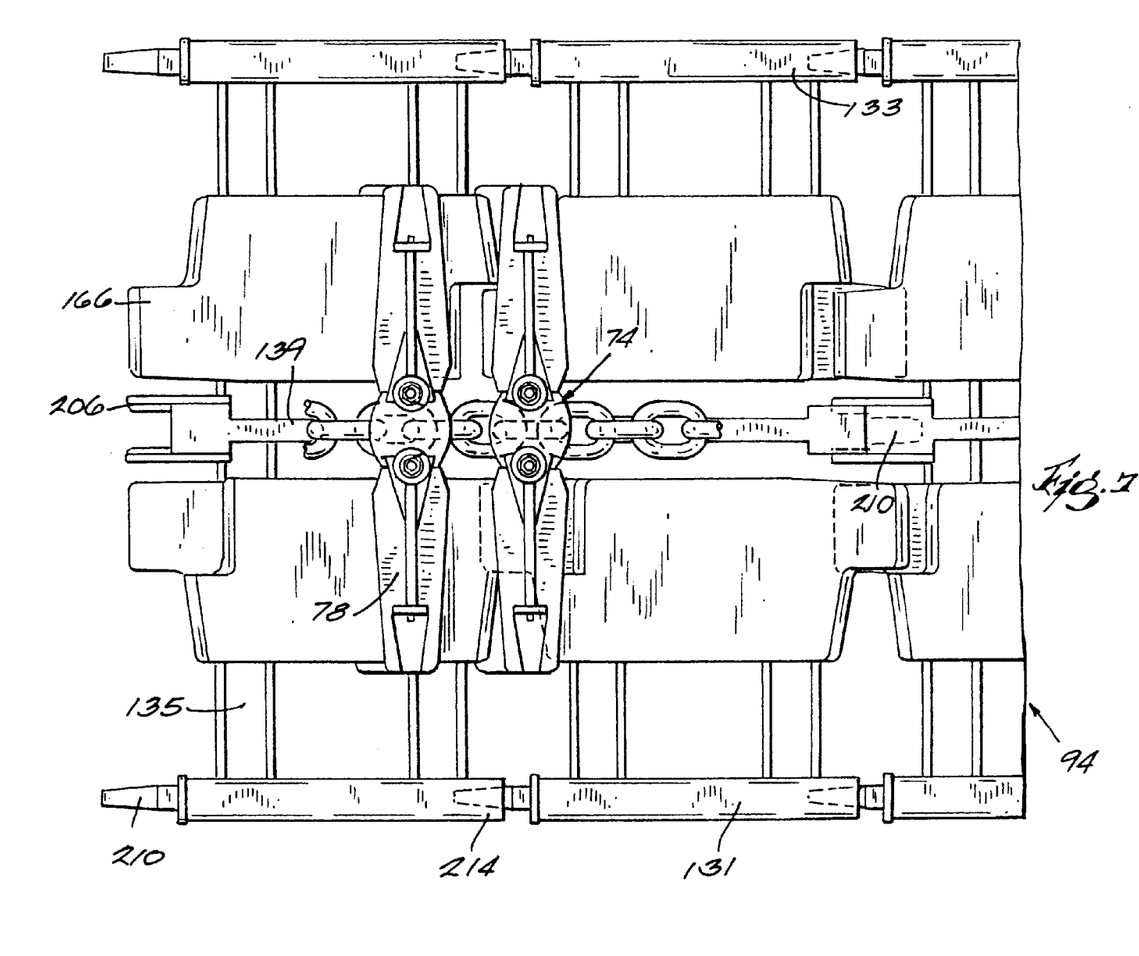
FIG. 7 is a partial top view of the framework members shown in FIG. 5.

More particularly, as can be seen in FIGS. 5, 6 and 7, each framework member 66 includes a bottom section 94 which supports part of the crawler chain assembly 74 and, at predetermined intervals, the various drive components therefore. In addition, the bottom section 94 of the framework member 66 supports, as shown in FIG. 3, an upper section 96 that contains the support elements for the orbitally moveable conveyor belt 70.

As shown in FIGS. 5, 6 and 7, the framework members 66 further include left and right outboard side tubes 131 and 133, respectively, a central draw bar 139, a plurality of spaced apart cross braces 135 extending perpendicular to and between the side tubes 131 and 133 and the draw bar 139, and splines 137 that attach the cross braces 135 and draw bar 139 to the framework member upper portion 88 and the framework member bottom portion 84.

As can be seen in FIG. 3, the upper section 96 of each framework member 66 includes left and right conveyor belt support members 100 and 102. Support members 100 and 102 are bolted to the side portions 131 and 133 of the bottom section 94. There exists a generally open area between support members 100 and 102 directly above bottom section 94.

A plurality of rollers comprise the means mounted on each framework member 66 for moveably supporting the orbital conveying belt 70 within the open area of the articulated conveyor 56. An upper series of rollers are provided for supporting the upper conveying run portion of the belt 70 and a lower series of rollers are provided for supporting the lower run portion of the belt 70.

Edge rollers 104 and 106 are mounted on brackets 108 and 109 respectively which are mounted across the bottom of the upper section 96, thereby supporting edge rollers 104 and 106. The brackets 108, 109 are attached in any convenient manner to the support members 100 and 102. In the preferred embodiment, a pair of belt support rollers 112 and 114 are also supported by and within bracket 108, 109.

In the preferred embodiment, the upper conveying run portion of the belt 70 is supported by respective left and right troughing idlers 116 and 118 and a centrally-disposed dumbbell idler 120. As can be seen in FIG. 3, the troughing idlers 116 and 118 are disposed at a predetermined angle with respect to dumbbell idler 120 to give and maintain the upper conveying run in a trough-shaped configuration. The troughing idlers 116 and 118 are maintained at this predetermined angle by a pair of support brackets 122 and 124.

For maintaining the upper conveying run portion of the orbital belt 70 in an operative position on the troughing idlers 116 and 118 and the dumbbell idler 120, each framework member 66 is provided with a respective left and right upper edge idler 126 and 128. The edge idler 126 is supported on bracket 122 and the edge idler 128 is supported by bracket 124. As can be seen in FIG. 3, the left and right edge idlers 126, 128 rotate about an axis oriented generally perpendicular to the axis rotation of troughing rollers 116 and 118. This orientation of the edge rollers provides rolling support for the edge of the belt and minimizes scuffing.

In the preferred embodiment, the belt 70 is driven at each end of the articulated conveyor 56 by an electric motor and speed reducer (not shown). The details of this drive are taught in U.S. Pat. No. 4,339,031 in FIGS. 21–23, and are incorporated herein by reference. It can be seen that there are any number of well-known methods for driving an orbital conveyor belt which could also be utilized in the present articulated conveyor.

Figure 4:
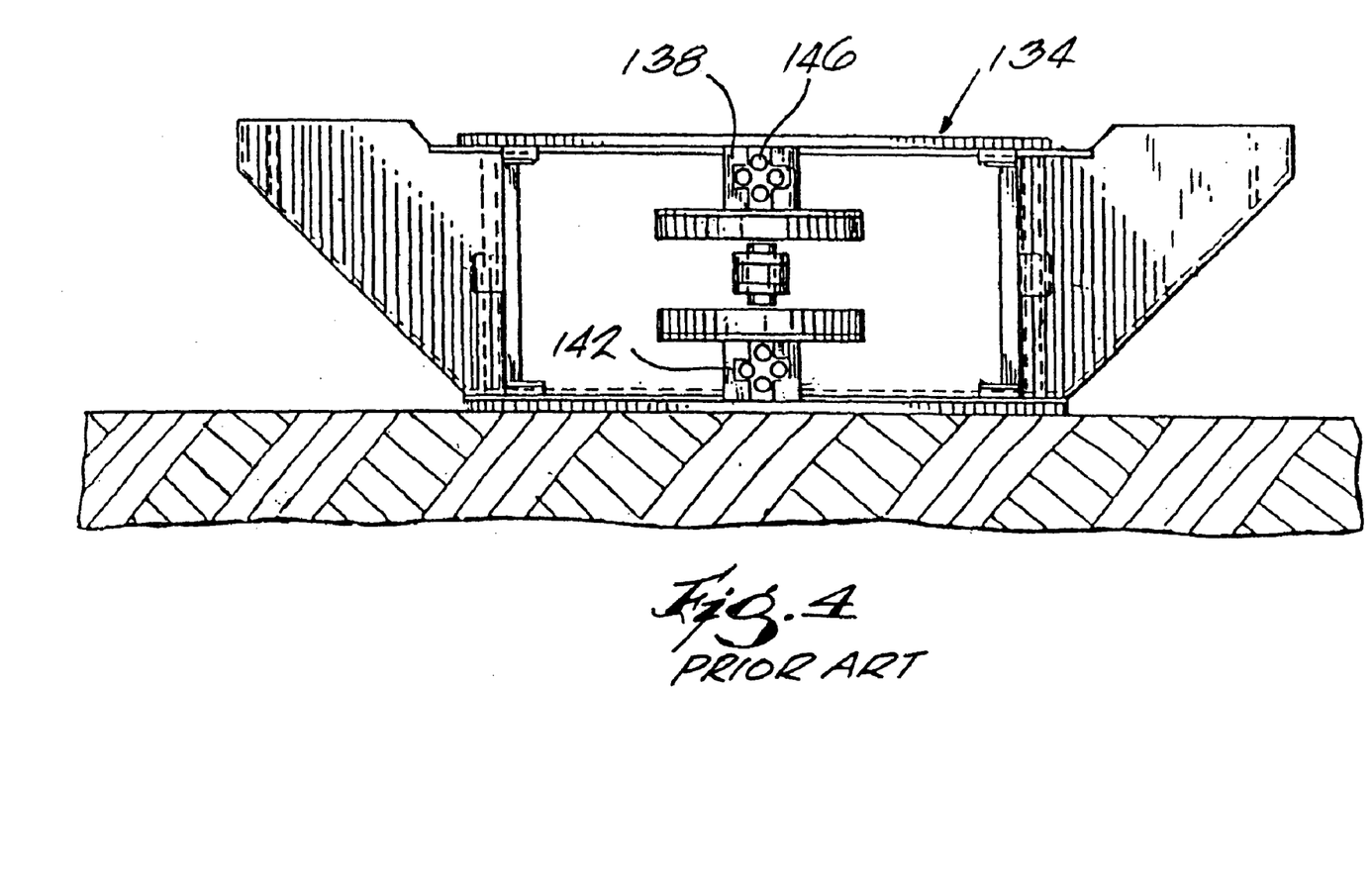
FIG. 4 is an end view of the chain drive portion of the articulated conveyor system framework member found in the prior art showing how the drive chain was trapped within a chain guide.

In the prior art articulated conveyor of Bodimer U.S. Pat. No. 4,852,724, as shown in FIG. 4, a bottom section 134 was provided with chain guides generally denoted as 138 for the upper chain guide and 142 for the lower chain guide. Each chain guide was composed of a pair of identical guide members. The chain guides were of a cruciform shape so that alternate links of a chain 146 were maintained in parallel, but at right angles to the intermediately adjacent link. This structure entraped the chain 146 keeping the links from either going upwards or sideways or twisting. Although adequate for its intended purpose, the chain guides caused significant wear of the chain links, resulting in a need for frequent replacement of the chain. In the articulated conveyor 56 of this invention, significant wearing of the chain links has been eliminated, as more fully described below.

More particularly, as shown in FIGS. 5 and 7, the top and bottom portions 88 and 84, respectively, are each composed of two identical plates 150 and 154. The plates are arranged in spaced apart side by side relation so as to form a nearly solid surface for supporting the crawler chain assembly 74, as described below. Each of the plates includes an irregular forward edge 160 and an irregular rearward edge 162 so that at least part of the irregular forward edge of one framework member mates with at least part of the irregular rearward edge of an adjacent framework member to form a surface at least partially supporting the crawler chain pads as each pad traverses between adjacent framework members 66.

More particularly, each of the front and rear edges of the plates include a tab 166 protruding on about half of each edge. As shown in FIGS. 5 and 7, the irregular edges cooperate with adjacent plates on adjacent framework members to form a nearly continuous surface for supporting the crawler chain assembly 74. By providing the irregular edges, a solid plate surface 92 supports the crawler chain assembly 74 at all times, even as the chain assembly 74 passes from one framework member 66 to another.

As can be seen in FIG. 6, the plates forming the bottom portion 84 are a flipped over arrangement of the plates forming the top portion 88. As a result, if, for example, the bottom portion plates wear more quickly then the top portion plates, the upper section 96 can be detached from the bottom section 94 of the framework member 66 at the time of the next major overhaul of the articulated conveyor 56. The bottom section 94 can then be flipped over, and the upper section 96 reattached. This will significantly extend the life of the bottom section components.

As mentioned earlier, each crawler chain pad 78 is connected to a part of the chain links 82 by the guide retainer assembly 130 shown in FIG. 6. The guide retainer assembly, 130 includes a guide retainer 170 having a width that is greater than larger of the spacing between the plates forming the upper and the lower portions of the framework member 66, and means for securing the guide retainer 170 to a respective crawler chain pad 78 between the upper and lower portion spaced apart plates 150 and 154 so that the guide retainer 170 is on the inside of the framework member 66 and the crawler chain pad 78 is on the outside of the framework member 66.

The spacing between the plates 150 and 154 forming the top and bottom portions 88 and 84 of the framework members 66 permit passage of the crawler chain assembly 74 between the plates. More particularly, the guide retainers 170 pass within the interior of the framework member 66, held within the member by the plates 150 and 154. The chain links 82 extend between the spacing between the plates 150 and 154, and the crawler pads 78 are outside of the framework member 66 but guided along the framework member 66 by the guide retainers 170.

More particularly, the guide retainer 170 has a central portion 174 that has a recess 176 to receive a chain link 82, a left wing 178 extending from the central portion 174, and a right wing 180 extending from the central portion 174. The wings 178 and 180 and central portion 174 form a width that is greater than the spacing between the plates 150 and 154 forming the top and bottom portions 88 and 84, respectively, thus securing the retaining guide 170 within the framework member 66. Sufficient clearance is provided between the guide retainer 170 and the plates 150 and 154 so as to limit wear between the guide retainer 170 and the plates 150 and 154. Unlike in the prior art constructions, the guide retainers are of sufficient bulk to permit extended use without a need for a replacement. Further, unlike in the prior art, the guide retainers 170 take the wear, not the chain links 82, for it is the guide retainers 170 that rub against the framework member plates 150 and 154, and not the chain links 82.

Figure 8:
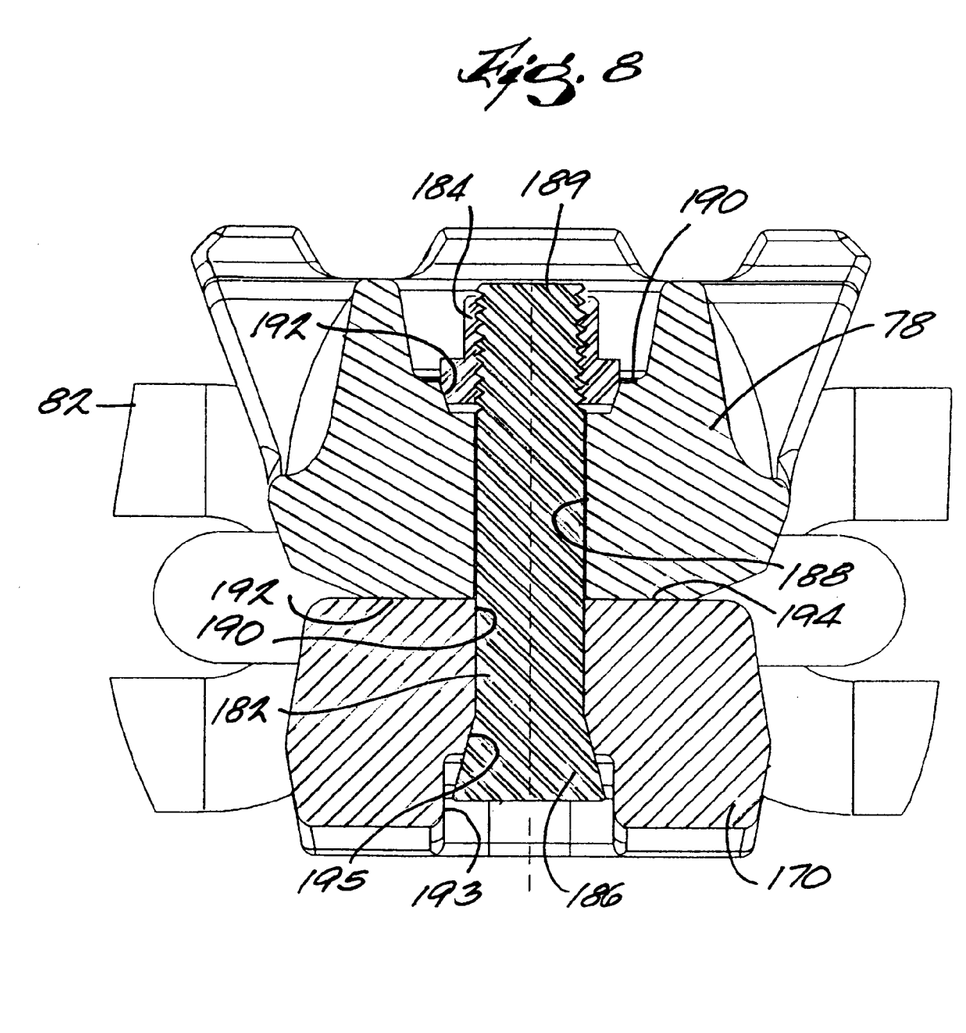
FIG. 8 is a cross-sectional view of a bolt which extends through the crawler pad and the guide retainer.

Still more particularly, as shown in FIG. 8, the means for securing the guide retainer 170 to a respective crawler chain pad 78 comprises a bolt 182 and a nut 184. An opening 188 extends through the crawler pad 78, and a mating opening 190 extends through the guide retainer 170. The crawler chain pad 78 is connected to the guide retainer 170 by the bolt 182 extending through the mating openings in the guide retainer 170 and the crawler chain pad 78. The bolt 182 has a tapered head 186 on an end thereof, and the tapered head 186 increases in diameter as it nears the end of the bolt 182, and the other end 189 of the bolt 182 is threaded. The crawler chain pad 78 has a first surface 190 and a second surface 192, and the crawler chain pad opening 188 extends from the first surface 190 to the second surface 192. The first surface 190 has a tapered enlargement 192 around the opening 188, the tapered enlargement 192 increasing in diameter as it nears the first surface 190. The guide retainer 170 also has a first surface 193 and a second surface 194, the opening 190 extending from the first surface 193 to the second surface 194, Further, the first surface 193 has a tapered enlargement 195 around the opening 190, the tapered enlargement 195 increasing in size as it nears the first surface 193, the crawler chain pad second surface 192 being adjacent the guide retainer second surface 194. The nut 184 also has a tapered outer surface, the nut being threaded on the bolt 182 so that the taper increases in diameter as the taper approaches the end of the bolt 182.

Figure 9:
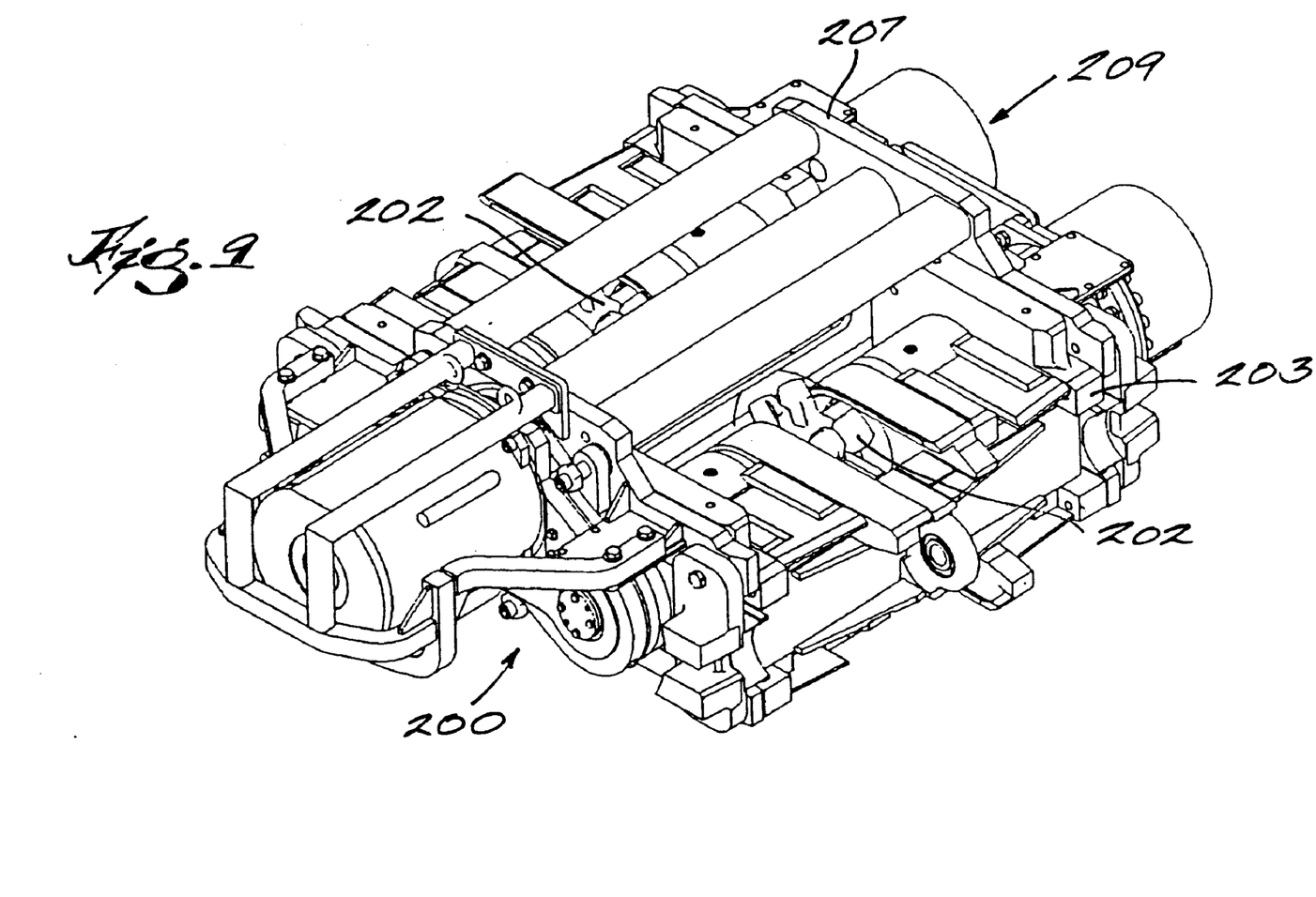
FIG. 9 is a prospective view of the drive member which drives the crawler chain.
Figure 10:
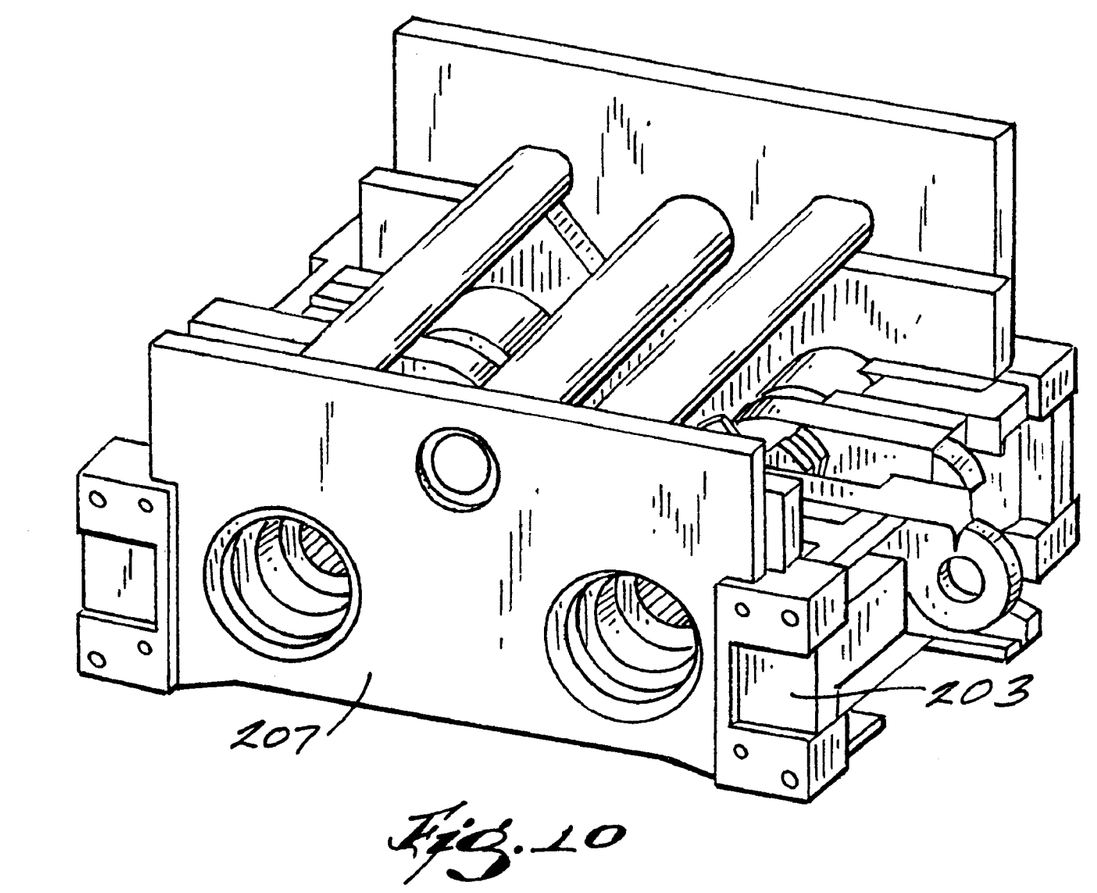
FIG. 10 is a prospective view of the drive framework.
Figure 11:
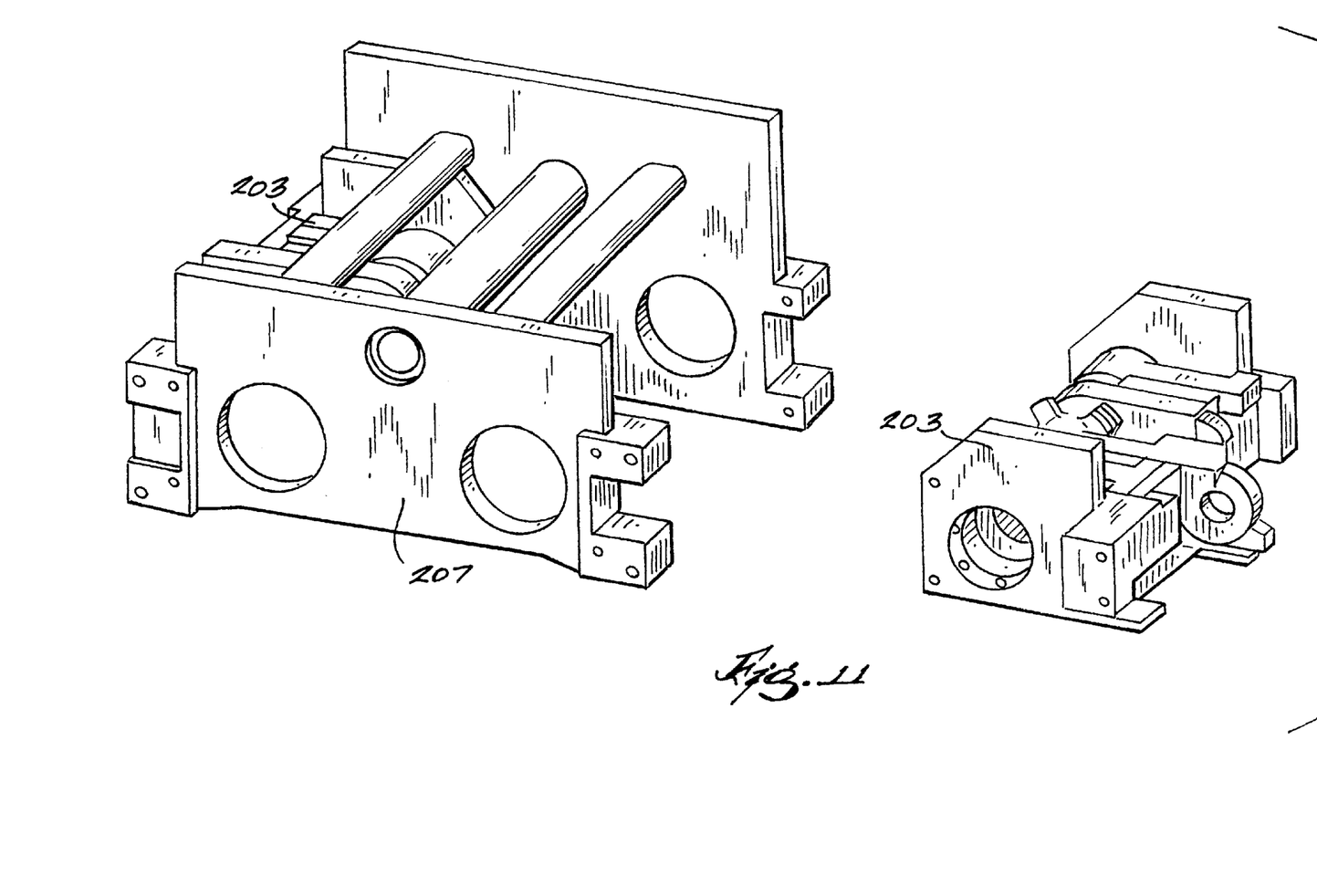
FIG. 11 is an exploded view shown in the sprocket module separated from the drive framework.
Figure 12:
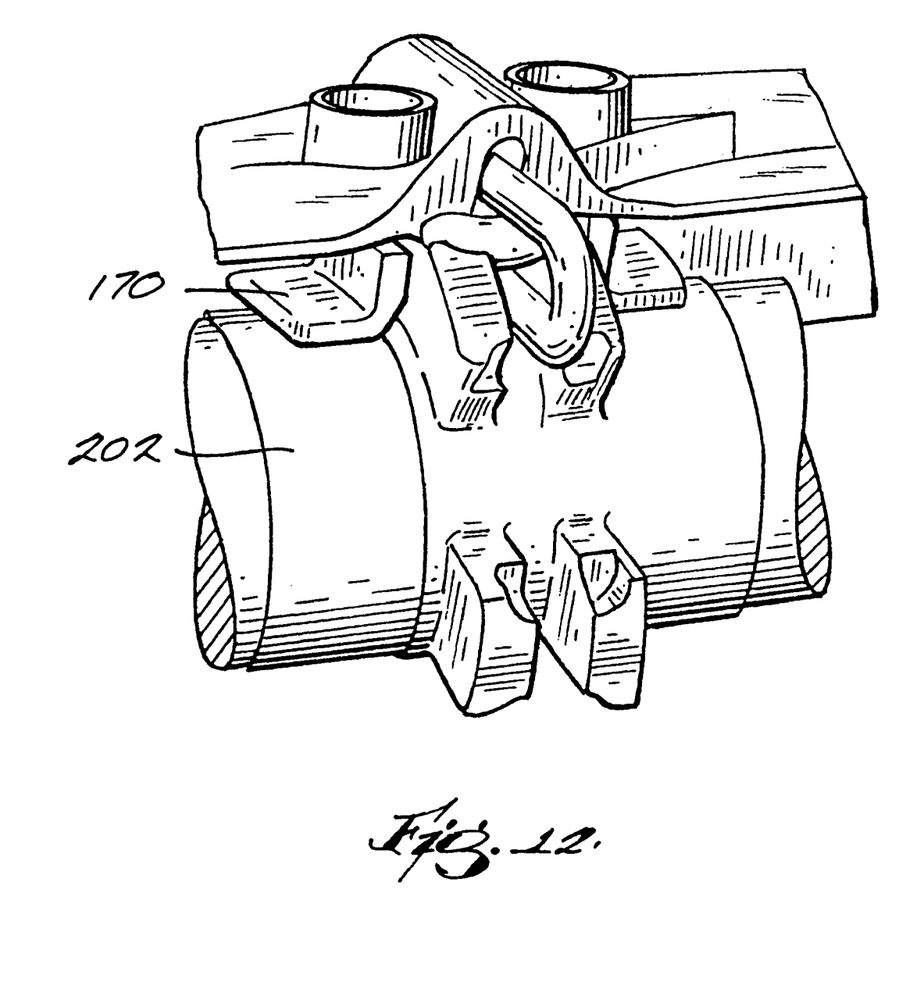
FIG. 12 is a prospective view of part of the sprocket portion of the drive member.

The articulated conveyor 56 also includes means for driving the crawler chain assembly 74, the driving means including a drive sprocket 202 (see FIG. 12) capable of engaging and circumferentially driving the orbitally moveable crawler chain assembly 74 to thereby propel the articulated conveyor 56 along the mine floor. In the preferred embodiment, the guide retainer 170 engages the sprocket 202. The sprocket 202 is designed to drive the crawler chain assembly 78, and is specially shaped to capture at least the guide retainer 170 and to thereby drive the guide retainer 170 for at least a portion of each revolution of the sprocket 202. As can be seen in FIG. 12, as the sprocket rotates successive guide retainers 170 engage, are driven, and disengage the sprocket 202. The vertical links, which alternate with horizontal links, pass freely around the sprocket 202 and are not driven. The drive sprocket 202 is rotatably held in a sprocket or idler module 203, as shown in FIGS. 9, 10 and 11. More particularly, the driving means further includes a power source, such as an electric motor 205, an idler module mounting frame 207, and a transmission 209 extending between the idler module 203 and the power source 205.

The articulated conveyor 56 further includes connector means on each framework member 66 that cooperate with connector means on each adjacent framework member for coupling the plurality of framework members, the connector means permitting movement between adjacent framework members 66. More particularly, as shown in FIGS. 5 and 7, the draw bar 139 has a first end 206 with a clevis-type arrangement and a second end 20 with a spherical ball joint arrangement. When the adjacent framework members are interconnected by a pin (not shown), the opposite ends of the adjacent draw bar 139 are mated such that the clevis and ball joint are interconnected thereby forming a universal connection. This universal connection, of course, allows universal movement between adjacent framework members 66 and also transmits longitudinal forces (push and pull) between framework members 66.

The adjacent framework members 66 also include cooperating means for limiting the articulation between adjacent framework members in the horizontal, vertical and longitudinal directions, such cooperating means comprising, as shown in FIGS. 5 and 7, the outboard side tubes 131 and 133 having a trapping 210 on one end, and the trapping 210 being received in a hollow other end 214 of the side tube of the next adjacent frame member 66. More particularly, each trapping 210 is bulbous in shape, so the narrow outer end of each trapping 210 can be easily inserted into the hollow end 214 of the adjacent framework member 66. When the articulated conveyor 56 negotiates a turn, however, the trapping 210 on the inside corner will extend further into the hollow end 214, thereby further restricting twisting of the articulated conveyor 56.

What is claimed is:

1. A material conveying system capable of traversing a floor along a curvilinear path, said system comprising:

a plurality of framework members arranged in tandem on said surface along a portion of said path to form an elongated longitudinally extending conveyor train;

connector means on each framework member cooperate with connector means on each adjacent framework member for coupling said plurality of framework members, said connector means permitting movement between adjacent framework members;

a plurality of said framework members including a crawler chain assembly comprising a plurality of crawler chain pads interconnected by chain links to form an endless loop, said crawler chain assembly extending continuously throughout said plurality of framework members along the longitudinal extent of said train, over a lower portion of each of said plurality of framework members wherein said crawler chain pads are maintained in engagement with said floor, and over an upper portion having an upper surface that supports the chain pads, and wherein adjacent framework members include cooperating means for limiting the articulation between adjacent framework members in the horizontal, vertical and longitudinal directions, such cooperating means comprising outboard side tubes having a trapping on one end, the trapping being received in a hollow other end of the side tube of the next adjacent frame member, and said framework members including means for supporting an orbitally moveable endless conveyor belt above said crawler chain assembly, the conveying run of said orbitally moveable conveyor belt operable to convey material substantially throughout the longitudinal extent of said train.

2. A material conveying system as set forth in claim 1 wherein said means for driving said crawler chain assembly includes a drive sprocket capable of engaging and circumferentially driving said orbitally moveable crawler chain assembly to thereby propel said conveying system along said upper surface.

3. A material conveying system capable of traversing a floor along a curvilinear path, said system comprising:

a plurality of framework members arranged in tandem on said surface along a portion of said path to form an elongated longitudinally extending conveyor train;

connector means on each framework member cooperate with connector means on each adjacent framework member for coupling said plurality of framework members, said connector means permitting movement between adjacent framework members;

a first plurality of said framework members including a crawler chain assembly comprising a plurality of crawler chain pads interconnected by chain links to form an endless loop, said crawler chain assembly extending continuously throughout said plurality of framework members along the longitudinal extent of said train, over a lower portion of each of said plurality of framework members where said crawler chain pads are maintained in engagement with said floor, said lower portion including two spaced apart plates, each plate having an irregular forward edge and an irregular rearward edge so that at least part of said irregular forward edge of one framework member mates with at least part of said irregular rearward edge of an adjacent framework member to form a surface at least partially supporting said crawler chain pads as each traverses between adjacent framework members, and over an upper portion having an upper surface that supports the chain pads, said upper portion including two spaced apart plates, each plate having an irregular forward edge and an irregular rearward edge so that at least part of said irregular forward edge of one framework member mates with at least part of said irregular rearward edge of an adjacent framework member to form a surface at least partially supporting said crawler chain pads as each traverses between adjacent framework members, and said framework members including means for supporting an orbitally moveable endless conveyor belt above said crawler chain assembly, the conveying run of said orbitally moveable conveyor belt operable to convey material substantially throughout the longitudinal extent of said train.

4. A material conveying system as set forth in claim 3 wherein adjacent framework members include cooperating means for limiting the articulation between adjacent framework members in the horizontal, vertical and longitudinal directions, such cooperating means comprising outboard side tubes having a trapping on one end, the trapping being received in the hollow other end of the side tube of the next adjacent frame member.

5. A material conveying system as set forth in claim 3 wherein said forward staggered edge and said rearward staggered edge are formed by a tab protruding on about half of each edge.

6. A material conveying system as set forth in claim 3 wherein said staggered edges of said upper portion plates and said staggered edges of said lower portion plates cooperate with adjacent plates on adjacent framework members to form a nearly continuous surface for supporting the crawler pads.

7. A material conveying system as set forth in claim 3 wherein each of the plates said upper portion plates and said lower portion plates are identical to each other.

8. A material conveying system as set forth in claim 3 wherein said framework member upper portion and said framework member lower portion are essentially the same so that said framework member functions the same when the plate portions of the framework member is flipped over.

9. A material conveying system capable of traversing a floor along a curvilinear path, said system comprising:

a plurality of framework members arranged in tandem on said surface along a portion of said path to form an elongated longitudinally extending conveyor train;

connector means on each framework member cooperating with connector means on each adjacent framework member for coupling said plurality of framework members, said connector means permitting movement between adjacent framework members;

said framework members including a crawler chain assembly including a plurality of crawler chain pads, said crawler chain assembly extending continuously throughout said plurality of framework members along the longitudinal extent of said train, over a lower portion of each of said plurality of framework members where said crawler chain pads are maintained in engagement with said floor, said lower portion including two spaced apart plates, and over an upper portion having an upper surface that supports the chain pads, said upper portion including two spaced apart plates, said crawler chain assembly comprising a plurality of interconnected chain links forming an endless loop, said plurality of crawler chain pads, each being connected to a part of said chain links by a guide retainer assembly, said guide retainer assembly including a guide retainer having a width that is greater than the larger of the spacing between the plates forming the upper and the lower portions of the framework member, and means for securing said guide retainer to a respective crawler chain pad between said upper and lower portion spaced apart plates so that said guide retainer is on the inside of said upper and lower portion spaced apart plates and said crawler chain pad is on the outside of said upper and lower portion spaced apart plates, and said framework members including means for supporting an orbitally moveable endless conveyor belt above said crawler chain assembly, the conveying run of said orbitally moveable conveyor belt operable to convey material substantially throughout the longitudinal extent of said train.

10. A material conveying system as set forth in claim 9 wherein adjacent framework members include cooperating means for limiting the articulation between adjacent framework members in the horizontal, vertical and longitudinal directions, such cooperating means comprising outboard side tubes having a trapping on one end, the trapping being received in the hollow other end of the side tube of the next adjacent frame member.

11. A material conveying system as set forth in claim 9 wherein each of the plates said upper portion plates and said lower portion plates are identical to each other.

12. A material conveying system as set forth in claim 9 wherein said framework member upper portion and said framework member lower portion are essentially the same so that said framework member functions the same when the plate portions of the framework member is flipped over.

13. A material conveying system as set forth in claim 9 wherein said guide retainer has a central portion that has a recess to receive a chain link, a left wing extending from the central portion, and a right wing extending from the central portion.

14. A material conveying system as set forth in claim 9 wherein said means for securing said guide retainer to a respective crawler chain pad comprises a bolt and a nut, and wherein an opening extends through said crawler pad, and a mating opening extends through said guide retainer, and wherein said crawler chain pad is connected to said guide retainer by said bolt extending through said mating openings in said guide retainer and said crawler chain pad.

15. A material conveying system as set forth in claim 14 wherein said bolt has a head on an end thereof, and said tapered head increases in diameter as it nears the end of the bolt, and the other end of said bolt is threaded, and wherein the crawler chain pad has a first surface and a second surface, said crawler chain pad opening extending from said first surface to said second surface, and wherein said first surface has a tapered enlargement around said opening, said tapered enlargement increasing in diameter as it nears the first surface, and wherein said guide retainer has a first surface and a second surface, said opening extending from said first surface to said second surface, and wherein said first surface has a tapered enlargement around said opening, said tapered enlargement increasing in size as it nears the first surface, said crawler chain paid second surface being adjacent said guide retainer second surface, and wherein said nut has a tapered outer surface, said nut being threaded on said bolt so that said taper increases in diameter as the taper approaches the end of the bolt.

* * * * *